July 18, 1967  J. D. RAPP  3,331,149
SCRAPER WITH ENDLESS LOADING CONVEYOR
Filed Feb. 12, 1965  4 Sheets-Sheet 1

INVENTOR.
Julian D. Rapp
Webster & Webster
ATTYS.

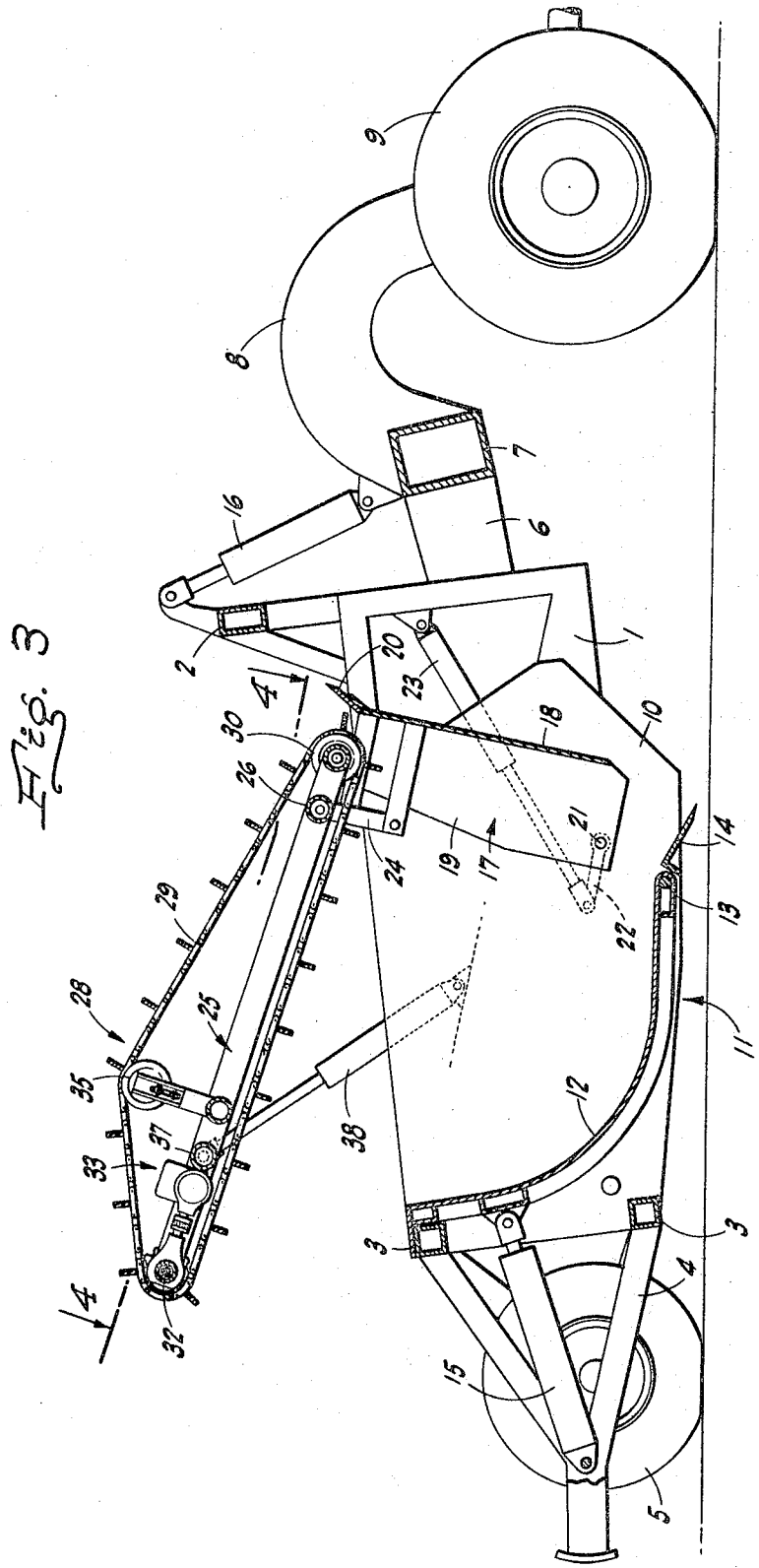

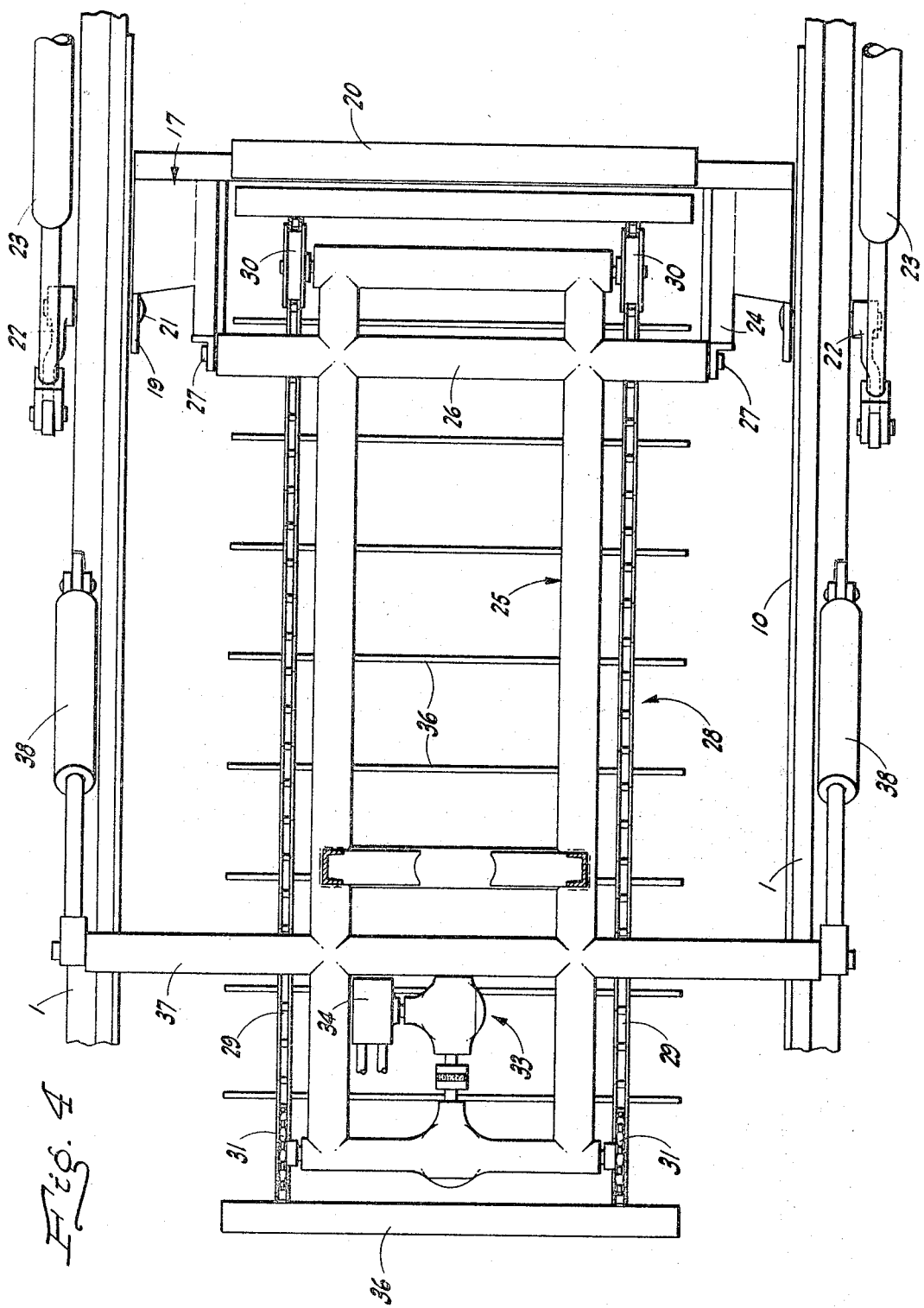

United States Patent Office 3,331,149
Patented July 18, 1967

3,331,149
SCRAPER WITH ENDLESS LOADING CONVEYOR
Julian D. Rapp, Crows Landing, Calif., assignor of one-third to Jane L. Salvador, San Leandro, Calif., and one-sixth each to Willis Rapp, Wallace B. Lindquist, and Harold D. Lindquist, all of Turlock, Calif., and Julian D. Rapp, Crows Landing, Calif.
Filed Feb. 12, 1965, Ser. No. 432,186
3 Claims. (Cl. 37—8)

ABSTRACT OF THE DISCLOSURE

A heavy duty carry-type earth scraper which—in association with the main, load-receiving bowl of the scraper—includes scraping and load distributing apparatus operative in use to increase the efficiency and load capacity of such scraper.

---

The major object of the invention is to provide a novel apparatus attached to such a scraper, and by means of which apparatus a greater load may be introduced into the bowl than would otherwise be the case, and better control of the dumping or unloading action is obtained.

More specifically, the invention includes, and it is another object to provide, a trough-like scraping extension ahead of the main scraping blade of the scraper, and which extension, when the scraper is full, may be raised to an unloading position.

In connection with the scraping extension feature, the invention also includes, and it is an additional important object to provide, an endless ladder-type conveyor which normally overlies both said scraping extension as well as the forward portion of the bowl to assist in loading the same by moving the scraped material toward the rear of said bowl.

It is also an object of this invention to arrange the above novel features in association with each other and with the scraper so that the endless conveyor may be detached without affecting the operation of the scraping extension. Additionally, such scraping extension may be detached from the scraper if its use is not desired. In any case, no alterations of the scraper are required in order to apply the features of my invention thereto other than the provision of a few pivot-mounting means thereon.

A further object of the invention is to provide scraper mounted apparatus—as above—which is designed for ease and economy of manufacture, and ready installation.

A still further object of the invention is to provide a practical, reliable, and durable scraper mounted apparatus which is exceedingly effective for the purpose for which it is designed.

These objects are accomplished by means of such structure and relative arrangement of parts as will fully appear by a perusal of the following specification and claims.

In the drawings:

FIG. 3 is a sectional elevation of the scraper, showing the same with the bowl, scraping extension, and endless conveyor in raised positions.

FIG. 4 is a fragmentary enlarged sectional plan view, taken substantially on line 4—4 of FIG. 3.

Figure 1:
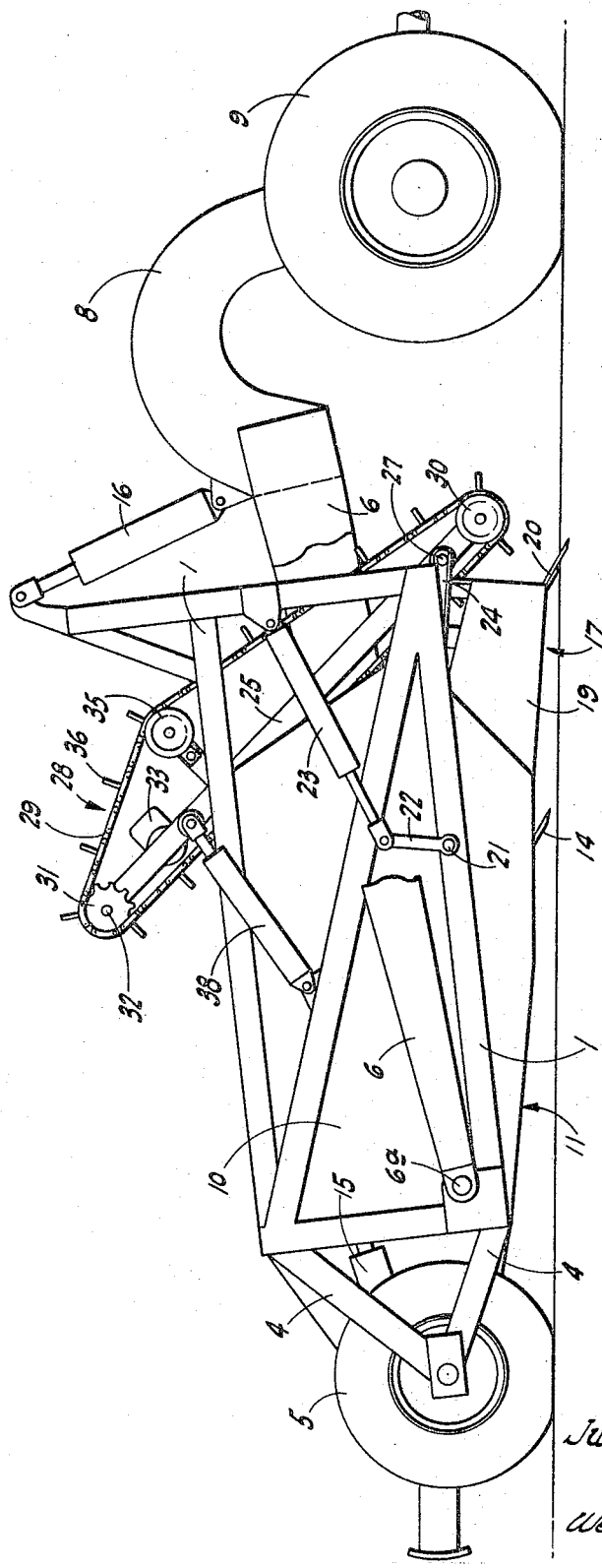
FIG. 1 is a side elevation of a scraper with the apparatus of the present invention mounted thereon; the view showing the normal scraping position, and the near main side beam being partly broken away.

Referring now more particularly to the drawings and to the characters of reference marked thereon, the scraper comprises transversely spaced side frames 1 of skeleton form which are connected at the top and front by a cross beam 2, and at the rear by a pair of vertically spaced cross beams 3 as shown in FIG. 3. Short converging longitudinal beams 4 extend rearwardly from the beams 3, and certain ones of such beams 4 are connected at their rear ends to the rear wheels 5 of the scraper.

Main side and draft beams 6 extend forwardly from adjacent the rear ends of the side frames 1 outside the same, and are pivoted at their rear ends thereon as at 6a. These beams 6 slope upwardly and at their forward ends (disposed a short distance ahead of the side frames 1) are connected by a cross beam 7. A central gooseneck 8 extends forwardly from the beam 7 and is connected to the front steerable wheel truck 9 to which a tractor may be hitch-connected in draft relation.

Side plates 10 are secured to the inner faces of the side frames 1 and cover the greater portion of the area thereof and form part of the bowl 11 of the scraper. Extending between the side plates 10 is a combination curved back and bottom plate 12 of the bowl, as shown in FIG. 3. This plate 12, at its forward lower end, is pivoted on the side plates 10 intermediate their ends, as shown at 13.

A rigid, transversely extending, downwardly sloping scraping blade 14 is secured to and spans between the side plates 10 immediately ahead of the pivoted end of the plate 12 and in position to deliver onto the same.

A hydraulic ram 15 is connected between the rear ends of the laterally inner ones of the beams 4 and the back of the bowl 11 relatively close to the upper end thereof, so that said bowl may be swung up about the pivot 13 as an axis.

Another hydraulic ram 16 is connected between the cross beams 2 and 7 whereby the side frames 1, the bowl 11, and all parts connected thereto, are swung up or down about the wheels 5 as an axis.

The above described features of construction are generally common to certain types of earth working scrapers, and in themselves form no part of the present invention which will now be described.

Figure 2:
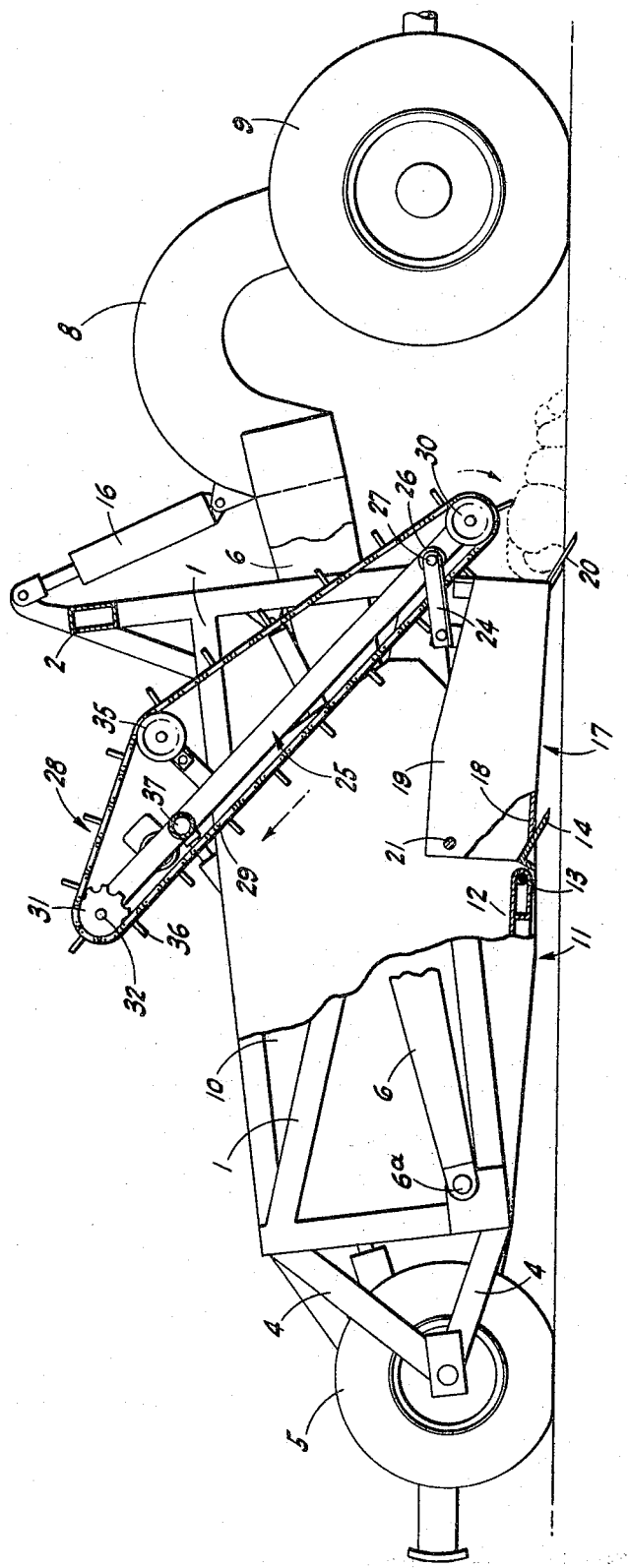
FIG. 2 is a similar view, but with the bowl also partly broken away and in section.

A scraping extension for the bowl 11, indicated generally at 17, is disposed in front thereof; such extension 17 comprising a straight bottom plate 18, side plates 19 upstanding for the full length of the bottom plate 18, and a rigid, transversely extending, downwardly sloping scraping blade 20 projecting forwardly from said bottom plate. The side plates 19 of the scraping extension 17 are disposed immediately adjacent the corresponding side plates 10 of the bowl 11 and—when the extension 17 is in a forwardly projecting, scraping position—such side plates 19 project some distance ahead of said side plates 10. At their rear end and adjacent the top, the side plates 19 are pivoted to the corresponding side plates 10 by trunnions 21 rigid with said side plates 19. Also, when the extension 17 is in scraping position, the bottom plate 18 abuts at the rear against the blade 14, as shown in FIG. 2, so as to deliver onto the same.

Each trunnion 21 is provided with a radial arm 22 rigid therewith and disposed outwardly of the related side frame 1; each such arm extending upwardly when the extension 17 is in scraping position. A hydraulic ram 23 extends between each arm 22 and the forward end of the adjacent side frame 1; such rams having a stroke of sufficient length to enable the extension 17 to be swung between the substantially horizontal scraping position shown in FIG. 2 and a substantially vertical unloading position as shown in FIG. 3.

The scraping extension 17 is provided at the sides and adjacent its forward end with normally upstanding, short but rigid frame units 24. A longitudinal frame 25 extends rearwardly and upwardly from the units 24; said frame 25 including a cross bar 26 a short distance back from its forward end, and which cross bar extends to and is pivoted on the frame units 24 at their forward ends, as at 27.

The longitudinal frame 25 is included in and provides the support for an endless, ladder-type, bowl-loading conveyor 28 which extends from end to end of said frame. The transversely spaced endless chains 29 of the conveyor 28 are trained about frame-mounted front and rear sprockets 30 and 31, respectively; the former being a short distance ahead of the pivots 27 so that the forward end of the conveyor 28 is normally in front of the scraping blade 20, as shown in FIG. 2. The rear sprockets 31 are connected by a shaft 32 which is arranged to be driven by a suitable conventional mechanism indicated at 33. In the present case, such mechanism is operated by a hydraulic motor 34 directly connected thereto as shown in FIG. 4.

The lower runs of the endless chains 29 are a short distance below and parallel to the longitudinal frame 25, while the upper runs are engaged by take-up rollers 35. The conveyor, of course, includes cross cleats 36 connected to and extending between the chains 29 at evenly spaced points in the length thereof.

The longitudinal frame 25 includes a transverse beam 37 disposed relatively close to the rear end of said frame and of a length to overlie the side frames 1 as shown in FIG. 4. Hydraulic rams 38 are pivotally connected to and extend between the ends of the beam 37 and the related side frames 1 to control the position of the longitudinal frame 25 and the conveyor 28 supported thereby when the extension 17 is swung from scraping position to unloading position.

The disposition of the scraping extension 17 relative to the conveyor 28 (which is directly connected to said extension) is such that when said extension 17 is in a scraping position, the conveyor 28 is disposed at a somewhat steep upward slope to the rear, as shown in FIGS. 1 and 2; the rams 23 and 38 being then fully retracted. The conveyor 28 is then in position to aid in loading material in front of the blade 20 onto the extension 17 as indicated in FIG. 2, and to also engage heaped material as the latter is passed into the front of the bowl 11 whereby to shift a portion of such heaped material toward the rear of the bowl. In this manner, faster and more even and complete loading of the scraper is obtained than would otherwise be the case.

For transport of the loaded scraper from the loading area to the point of discharge, the scraper—including bowl 11 and scraping extension 17—is raised by hydraulic ram 16 until blade 20 clears the ground; said scraping extension 17—which carries part of the load—remaining in its substantially horizontal position during such transport.

At the point of discharge and as the scraper moves forward, the rams 23 are actuated to swing the extension 17 upwardly about the trunnions 21 as an axis and until said extension is in a substantially vertical, unloading position, as shown in FIG. 3. When the extension 17 is thus swung upwardly, the portion of the load thereon discharges therefrom and is spread by the blade 14. Simultaneous with such upward swinging of extension 17, the forward end of the conveyor 28 is also swung upward from its normal position as well as being shifted a considerable distance to the rear; said conveyor 28—which is supported at the rear by the initially retracted rams 38—assuming a substantially horizontal position.

Nextly, the rams 38 are extended so as to swing the conveyor 28 upwardly at the rear and about the pivots 27 at the front so as to lift said conveyor clear of the frames 1 and the top of the bowl 11, as shown in FIG. 3. This enables the bottom plate 12 of the bowl to be tilted upwardly (by extending the ram 15) so that the material in the bowl is discharged through the space between the lower edge of the raised extension 17, and blade 14; the latter spreading such discharging material.

With the described scraper mounted apparatus (including essentially the extension 17 and conveyor 28), loading of the scraper is greatly facilitated, and with better control of dumping of the load. At the same time, the construction and general operation of the original scraper remains unchanged.

If it is desired to operate the scraper in the conventional manner and without the use of the scraping extension 17 and ladder-type conveyor 28, both are moved to their raised positions; the bowl then being loaded directly from the blade 14.

Further, if operating conditions require, the scraping extension 17 and ladder-type conveyor 28 can both be readily removed from the scraper, or said conveyor can be removed and the extension 17 used alone in association with the bowl.

From the foregoing description, it will be readily seen that there has been produced such a scraper mounted apparatus as substantially fulfills the objects of the invention, as set forth herein.

While this specification sets forth in detail the present and preferred construction of the scraper mounted apparatus, still in practice such deviations from such detail may be resorted to as do not form a departure from the spirit of the invention, as defined by the appended claims.

Having thus described the invention, the following is claimed as new and useful and upon which Letters Patent is desired.

1. In a scraper which includes a bowl having a scraping blade at its forward end; a scraper-mounted apparatus comprising an endless ladder-type conveyor on the scraper and extending upwardly and rearwardly over a portion of said bowl from a low point ahead of the blade and relatively close to the ground, means mounting the forward end of the conveyor on the scraper for upward movement to a high point a substantial distance above the ground, means to move the forward end of the conveyor upward to said high point, and connecting means between the rear portion of the conveyor and scraper arranged so that, in response to movement of the forward end of the conveyor to such high point, said conveyor shifts substantially to the rear and occupies a position in the main above the bowl; said connecting means being extensible and operative, upon extension and when the conveyor is in said position above the bowl, to lift the conveyor a substantial distance at it rear end.

2. In a scraper which includes a bowl having a scraping blade at its forward end; a scraper-mounted apparatus comprising an endless ladder-type conveyor on the scraper and extending upwardly and rearwardly over a portion of said bowl from a low point ahead of the blade and relatively close to the ground, means mounting the forward end of the conveyor on the scraper for upward and rearward arcuate movement to a high point a substantial distance above the ground, means to move the forward end of the conveyor upward to said high point, and extensible connecting means between the rear portion of the conveyor and scraper arranged so that in response to the upward and rearward arcuate movement of the forward end of the conveyor to such high point, said conveyor shifts substantially to the rear and occupies a position in the main above the bowl; extension of said connecting means then lifting the conveyor a substantial distance at its rear end.

3. In a scraper which includes a bowl having a scraping blade at its forward end; a scraper-mounted apparatus comprising an extension member in front of the blade and including a longitudinal bottom plate having a scraping blade on its forward end, pivot connection means between the extension member adjacent its rear end and the scraper directly above the bowl blade, means between the scraper and extension member operative to swing the latter upwardly and rearwardly about the pivot means from a substantially horizontal position of said bottom plate, a driven ladder-type conveyor overlying said extension member, means pivoting the conveyor adjacent its forward end on the extension member above the plate blade, the conveyor extending upwardly and rearwardly from its forward end to a rear end termination above the bowl rearwardly of the bowl blade when said extension member is in a scraping position, the conveyor including a frame, and an extensible supporting unit extending between and pivoted at its ends to the scraper and to the conveyor frame; said unit extending forwardly to the conveyor frame at substantially right angles thereto and being contracted when the extension member is in a scraping position.

References Cited

UNITED STATES PATENTS

| | | | |
|---|---|---|---|
| 2,164,461 | 7/1939 | Le Bleu | 37—126 |
| 2,189,859 | 2/1940 | Evans. | |
| 3,191,322 | 6/1965 | Johnson et al. | 37—8 |
| 3,210,868 | 10/1965 | Liess | 37—8 |
| 3,296,716 | 1/1967 | Rezabek et al. | 37—8 |

FOREIGN PATENTS

| | | |
|---|---|---|
| 236,280 | 11/1961 | Australia. |

ABRAHAM G. STONE, *Primary Examiner.*

A. E. KOPECKI, *Assistant Examiner.*